United States Patent [19]

Baba et al.

[11] Patent Number: 4,783,141
[45] Date of Patent: Nov. 8, 1988

[54] ARRAY LENS

[75] Inventors: Takeshi Baba, Yokohama; Hiroyuki Imataki, Kawasaki; Masayuki Usui; Takashi Serizawa, both of Yokohama; Hiroyasu Nose, Tokyo, all of Japan

[73] Assignee: Canon Kabushiki Kaisha, Tokyo, Japan

[21] Appl. No.: 709,720

[22] Filed: Mar. 8, 1985

[30] Foreign Application Priority Data

Mar. 14, 1984 [JP] Japan ................................. 59-49574

[51] Int. Cl.$^4$ .............................................. G02B 15/00
[52] U.S. Cl. ........................................ 350/167; 350/423
[58] Field of Search ................................ 350/167, 423

[56] References Cited

U.S. PATENT DOCUMENTS 3,532,038 10/1970 Rottmann ............................ 350/167
4,712,882 12/1987 Baba et al. .......................... 350/413

FOREIGN PATENT DOCUMENTS 55-36857  3/1980  Japan .
56-110403 8/1981  Japan .
58-85415  5/1983  Japan .

Primary Examiner—Bruce Y. Arnold
Attorney, Agent, or Firm—Fitzpatrick, Cella, Harper & Scinto

[57] ABSTRACT

An array lens comprises a member having a plurality of arranged openings, an elastic member provided in intimate contact with the member and having its surface shape deformable by an extraneous pressure, and means for imparting a force to the elastic member to deform the surface shape of the elastic member in the openings of the member.

7 Claims, 3 Drawing Sheets

ARRAY LENS

BACKGROUND OF THE INVENTION

1. Field of the Invention

This invention relates to an array lens and its applications.

2. Description of the Prior Art

It is well known to form an array lens by arranging a plurality of refractive index gradient type lenses or by arranging a plurality of bar lenses. However, such an array lens has disadvantages that during the manufacture thereof, it is difficult to arrange lens elements and that the manufacturing cost thereof is high. Further, it is difficult to vary the imaging magnification of such an array lens.

Also, as a variable focus lens, there have heretofore been proposed one as disclosed in Japanese Laid-open Patent Application No. 36857/1980 wherein a container of elastic material is filled with liquid and the shape of the container is varied by the pressure of the liquid, and one which uses piezo-electric elements as disclosed in Japanese Laid-open Patent Application Nos. 110403/1981 and 85415/1983. However, the former so-called liquid lens requires a liquid reservoir and a pressing device and this leads to a problem in making the element compact, and the latter has a disadvantage that the amount of variation thereof cannot be secured very greatly.

SUMMARY OF THE INVENTION

It is an object of the present invention to overcome the above-noted disadvantages and to provide an array lens which is easy to manufacture.

It is a further object of the present invention to provide an array lens of which the focal length can be varied easily and in which the amount of variation in the focal length is great.

It is still a further object of the present invention to provide a compound-eye optical system effectively using such array lens.

In the array lens according to the present invention, the above objects are achieved by projecting or precipitating an elastic member from a plurality of openings to thereby form an optical surface having a power in the surface of the elastic member in said openings. That is, each optical element forming the array lens of the present invention can obtain a desired optical characteristic, for example, a focal length by convexly projecting or concavely precipitating a volume type elastic member itself from the openings of a predetermined member to thereby deform the optical surface formed by the elastic member in said openings. Such an array lens can be manufactured very easily.

Accordingly, in the array lens according to the present invention, simply by applying an extraneous force to the elastic member or simply by varying the volume of the elastic member, the optical surface of said openings can be reversibly varied to vary the power of the optical surface. In other words, the focal length of each optical element of the array lens can be varied. Means for accomplishing this further requires means for varying the force imparted to the elastic member. In such an array lens, the construction thereof and the control of the optical surface are easy and the rate of variation in the power of the optical surface can be set to a very great value due to the variation in optical characteristic based on the variation in the shape of the optical surface.

In the array lens according to the present invention, a member having a plurality of arranged openings for forming the optical surface of the elastic member may be a flat plate provided with openings or, when used with the elastic member being contained in a container, it may be at least one wall of the container which is provided with openings. Although it differs depending on the optical effect, these openings may generally be circular and usually form convex and concave lenses whose focal lengths are variable.

Also, by providing rectangular slit-shaped openings, it is possible to form a cylindrical lens array and a toric lens array.

The optical elements formed by these openings can have their shapes variable as desired by an extraneous force applied to the elastic member or a variation in the volume of the elastic member, and the degree of the variation in their shapes can be controlled by feeding back it while detecting the effect thereof.

It is also possible to provide such openings in a piezoelectric element and thereby the element can be made remarkably compact.

Means for imparting an extraneous force to the elastic member can be accomplished by any of all heretofore known methods, but it is desirable to effect deformation of the elastic member by a feedback mechanism while detecting the optical effect and for this purpose, a method is preferable which is capable of effecting electrical control of an electromagnet, a stepping motor, a piezo-electric element or the like. Also, the variation in volume by heating can be accomplished by a heater provided outside or inside the elastic member.

For the elastic member used in the array lens of the present invention, use may be made of any material having a property (elasticity) of being deformed by a force applied thereto and restoring its original shape when the applied force is removed as long as that force is not so great (that is, within the limit of elasticity).

In ordinary solids, the maximum distortion within the limit of elasticity thereof (the limit distortion) is of the order of 1%. Also, in vulcanized elastic rubber, the limit of elasticity is very great and the limit distortion thereof is approximately 1000%.

In the array lens according to the present invention, use is suitably made of a material having a modulus of elasticity corresponding to the characteristic of the lens to be formed, but a material having a small modulus of elasticity is generally preferable in order to readily obtain great elastic deformation or to render the state after the deformation optically more homogeneous.

The modulus of elasticity G is expressed as $G=\rho/\gamma$ (where $\rho=$ stress and $\gamma=$ elastic distortion). Also, elasticity which causes great deformation for a small stress is called high elasticity or rubber elasticity and thus, in the present invention, particularly this type of elastic material can be utilized preferably.

As such a rubber elastic material, mention may be made of natural rubber generally known as "rubber", for example, styrene butadiene rubber (SBR), butadiene rubber (BR), isoprene rubber (IR), ethylene propylene rubber (EPM, EPDM), butyl rubber (IIR), chloroprene rubber (CR), acrylonitrile-butadiene rubber (NBR), urethane rubber (U), silicone rubber (Si), fluorine rubber (FPM), vulcanized rubber (T) or polyether rubber (POR, CHR, CHC). Any of these materials exhibits a rubber state at room temperature. Generally, however, a high molecular substance assumes a glass state, a rubber state or a molten state depending on the degree of the Brownian motion of molecules. Accordingly, high molecular substances which exhibit the rubber state at the temperature whereat the array lens is used can be widely utilized as the elastic member of the present invention. The modulus of elasticity in the rubber state is determined chiefly by the bridged state of high molecular chains constituting the elastic member and accordingly, for example, the vulcanization in natural rubber is nothing but a treatment which determines the modulus of elasticity.

In the present invention, as the elastic member used, it is desirable to obtain great deformation for a small stress, and the adjustment of the bridged state therefor is important.

However, a decrease in the modulus of elasticity (a tendency of exhibiting great deformation for a small stress) results in reduced strength on the other hand and therefore, it is necessary to suitably select the elastic member used so that the strength corresponding to the purpose of the array lens to be formed may be kept. Measurement of the modulus of elasticity thereof is also effected by the selection from methods such as pulling, bending and compression in accordance with the kind of the stress which depends on the form of use of the array lens.

The modulus of elasticity of the elastic member used in the present invention is less than the modulus of elasticity $10^{11}$–$10^{13}$ dyne/cm$^2$ of ordinary solids, suitably less than the modulus of elasticity $10^8$ dyne/cm$^2$ of a rubber elastic member, preferably less than $10^6$ dyne/cm$^2$ and particularly preferably less than $5 \times 10^5$ dyne/cm$^2$, and a smaller lower limit of the modulus of elasticity is preferable if the elastic member is of a nature which does not spill out unlike ordinary liquid when it constitutes a lens. Array lenses are often used at room temperature, but are sometimes used at high temperatures or low temperatures and therefore, the above-mentioned range of the modulus of elasticity is that at the temperature whereat the array lenses are used.

The hardness or softness of the elastic member depends on the elasticity thereof to a certain degree. In JISK 6301, there is prescribed a method of imparting minute distortion to the surface of a sample by means of a spring and evaluating the hardness of rubber by the penetration thereof and thus, the hardness of the elastic member can be simply known.

However, if the modulus of elasticity is as low as $10^6$ dyne/cm$^2$ or less, measurement cannot be accomplished by the above-described method, and in that case, the hardness is evaluated by the penetration by the use of a ¼-inch micro-densimeter prescribed by JISK 2808.

Also, where the modulus of elasticity is small, it is difficult to measure it by "pulling-elongation" and therefore, the value thereof can be found by compression (5% deformation) and the correspondence thereof with the previously mentioned penetration can be found.

The rubber elastic member can be obtained by suitably (controlling the molecular chain length between bridged points) making into the form of gel not only the heretofore known materials provided by vulcanization (bridging) but also a material which does not require vulcanization such as ethylene-vinyl acetate copolymer or A - B - A type butadiene-styrene block copolymer, or chain-like high molecules.

The modulus of elasticity of any of these materials is controlled while the bridged state thereof, the combination of molecules in the block copolymer, the gel state, etc. are adjusted.

In addition to controlling the elastic member due to its own structure, by adding a diluent or a filler to the elastic member, it is also possible to vary and adjust the characteristic thereof.

For example, when silicone rubber [KE 104 (trade name) produced by Shinetsu Kagaku Kogyo Co., Ltd.] and a catalyst [AT-104 (trade name) produced by Shinetsu Kagaku Kogyo Co., Ltd.] are added, hardness and tensile strength are decreased and elongation is increased with an increase in the amount of addition thereof.

DETAILED DESCRIPTION OF THE PREFERRED EMBODIMENTS

Figure 1:
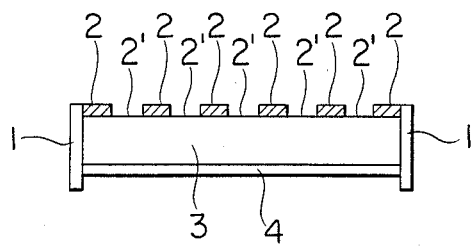
FIGS. 1 and 2 show the construction of an embodiment of the array lens according to the present invention.
Figure 2:
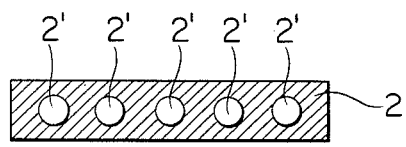
Figure 3:
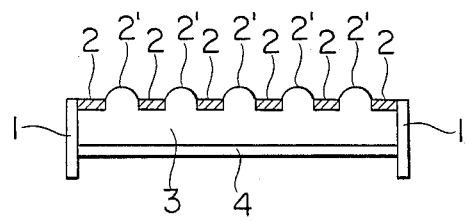
FIGS. 3 and 4 show the state of the array lens obtained by the construction shown in FIG. 1.
Figure 4:
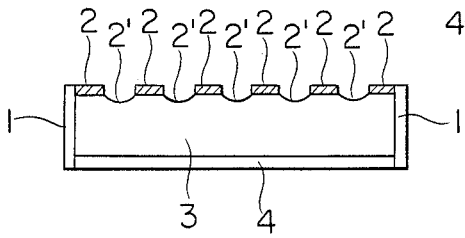

FIGS. 1 to 4 illustrate an embodiment of the array lens according to the present invention. Reference numeral 1 designates a rectangular parallelopiped container, and reference numeral 2 denotes an opening plate having a plurality of circular openings 2' arranged in a row as shown in the plan view of FIG. 2. The opening plate 2 is fixed to the container 1. Reference numeral 3 designates a transparent elastic member, and reference numeral 4 denotes a movable portion for pressing the elastic member. The movable portion 4 comprises an optically transparent parallel flat plate. Means for moving the movable portion may be any of various well-known means and is not shown. FIG. 1 shows a state in which the movable portion 4 does not apply a pressure to the elastic member 3, and in this state, the surface of the elastic member at the openings 2' is flat. FIG. 3 shows a state in which a pressure is applied to the elastic member 3 through the movable portion 4, and in this case, a part of the elastic member projects in the form of a convex lens from each opening in accordance with the magnitude of the pressure applied to the elastic member. FIG. 4 shows a state in which a negative pressure is applied to the elastic member through the movable portion 4, and in this case, the elastic member assumes the shape of a concave lens at each opening. This is because, due to the tackiness of the elastic member itself, the elastic member sticks to the opening plate 2 and accordingly the elastic member is deformed concavely at the openings 2'.

In this manner, depending on the magnitude of the extraneous force applied to the movable portion of the container, a desired lens surface shape can be realized at each opening by a part of the elastic member. The opening plate 2 having a number of openings 2' arranged in a row should desirably be optically opaque, but where it is transparent, it can be utilized as a double focus array lens. Also, the movable portion and the elastic member are adhesively or otherwise secured to each other as required. If required, the elastic member and the inner wall surface of the container may generally be adhesively secured to each other.

Figure 5:
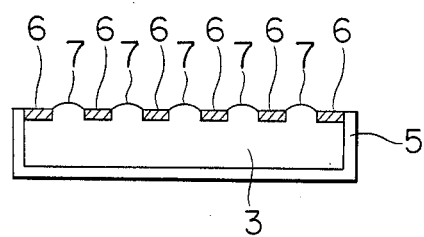
FIGS. 5 and 6 show the construction of another embodiment of the array lens according to the present invention.
Figure 6:
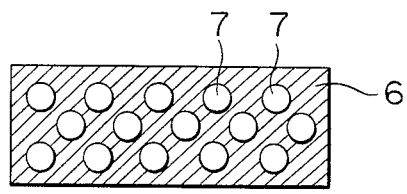

FIG. 5 shows another embodiment of the array lens according to the present invention. In this embodiment, an elastic member contained in a container 5 having an optically transparent parallel flat plate at the bottom thereof is pressed by a movable portion 6 having circular openings 7 as shown in FIG. 6. The movable portion 6 shown in FIG. 6 is an opening plate provided with rows of openings 7, but it may also be an opening plate 2 as shown in FIG. 2.

If the movable portion pressing the elastic member is thus used while being fixed in a certain state, the array lens can be used as a fixed focal length array lens, and by controlling the pressing of the movable portion, the array lens can be used as a variable focal length array lens. Means for controlling the pressing of this movable portion may be any of known various means and is not shown.

As a method for driving the movable portion, mention may be made of a method of forming a thread on the container and threading the movable portion thereinto, a method of forming the movable portion of a ferromagnetic material and driving it by an electromagnet or a method of forming the movable portion of a piezoelectric bimorph element and utilizing the deformation thereof.

A compound-eye optical system using the array lens according to the present invention will hereinafter be described.

Figure 7:
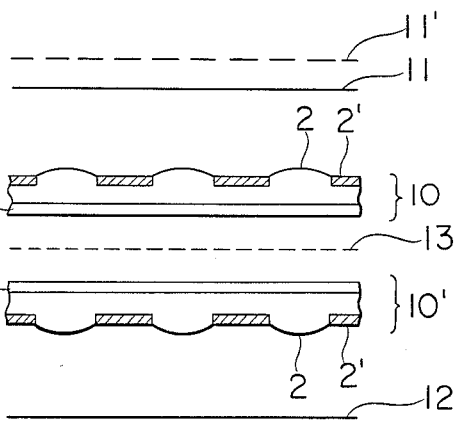
FIG. 7 shows an embodiment of a compound-eye optical system using the array lens according to the present invention.

FIGS. 7 to 9B show an erect one-to-one magnification compound-eye optical system using the array lens according to the present invention. Particularly, in this optical system, the conjugate relation between the object surface and the imaging plane can be easily adjusted by using the array lens according to the present invention. In a compound-eye optical system wherein light beams passed through a plurality of lenses are properly superposed one upon another to thereby obtain an image, effecting focusing so as to keep the imaging plane constant when the position of the object surface moves for some reason or other is impossible only by moving the entire lens in the direction of the optic axis as in an ordinary single-eye optical system. That is, in a compound-eye optical system, it is necessary to construct it so that the imaging plane may be kept constant even if the object surface moves while the imaging magnification is kept at erect one-to-one magnification FIG. 7 shows a cross-sectional view of a compound-eye optical system formed by the use of the array lens shown in FIG. 1 whose focus is variable. Reference numerals 10 and 10' designate the array lenses schematically depicted in FIG. 1, reference numeral 11 denotes the object surface, reference numeral 12 designates the imaging plane, and reference numeral 13 denotes the intermediate imaging plane of the object surface 11 by the array lens 10. In such an optical system, even when the object surface 11 is displaced to a position indicated by 11' for some reason or other, it is possible to image the object surface 11' at the position of the imaging plane 12 while keeping the erect one-to-one magnification imaging. The reason will hereinafter be described.

Figure 8A:
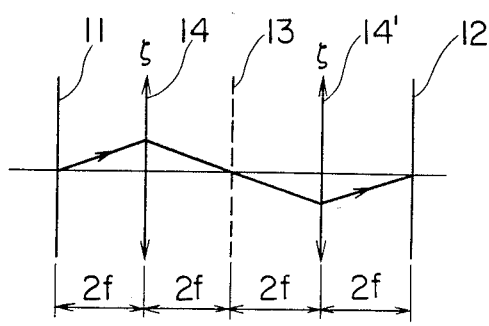
FIGS. 8A and 8B and FIGS. 9A and 9B show methods for maintaining the object surface and the imaging plane in an optically conjugate relation with the erect one-to-one magnification imaging being maintained.
Figure 8B:
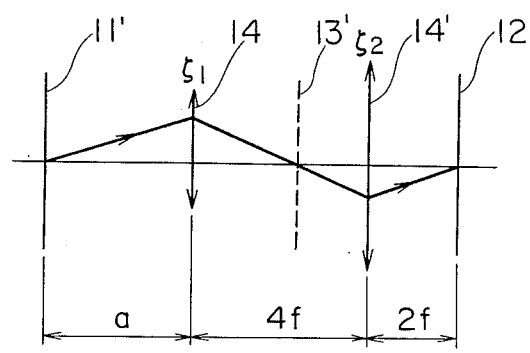

FIGS. 8A and 8B show a method for bringing the object surface and the imaging plane into a conjugate relation while keeping the erect one-to-one magnification imaging relation when the conjugate relation between the object surface and the imaging plane is destroyed in the compound-eye optical system shown in FIG. 7. In FIGS. 8A and 8B, a system comprising one set of lenses in the compound-eye system is simply depicted, and reference numeral 14 designates a lens formed in an opening of said array lens 10, and reference numeral 14' denotes a lens formed in an opening of said array lens 10'. In FIG. 8A which shows a standard state, the powers of the lens 14 and the lens 14' are $\phi$ and the focal length f thereof is $1/\phi$. As shown in FIG. 8A, the spacing between the object surface 11 and the lens 14, the spacing between the lens 14 and the intermediate imaging plane 13, the spacing between the intermediate imaging plane 13 and the lens 14' and the spacing between the lens 14' and the imaging plane 12 are 2f and accordingly, an inverted one-to-one magnification image of the object surface 11 is formed on the intermediate imaging plane 13 and an erect one-to-one magnification image of the object surface 11 is formed on the imaging plane 12.

FIG. 8B shows the manner in which an erect one-to-one magnification image is formed on the imaging plane 12 without the positions of the lens 14, the lens 14' and the imaging plane 12 being changed in a state in which the object surface 11 is displaced from the state of the system shown in FIG. 8A to the position of the object surface 11'. Reference numeral 13' designates the displaced intermediate imaging plane, and letter a denotes the distance between the lens 14 and the object surface 11'. To form an erect one-to-one magnification image on the imaging plane 12 in the positional relation as shown in FIG. 8B, the following conditions should be satisfied:

$$\begin{cases} \frac{1}{a} + \frac{1}{b} = \phi_1 \\ \frac{1}{c} + \frac{1}{2f} = \phi_2 \\ b + c = 4f \\ \frac{b}{a} \cdot \frac{2f}{c} = 1 \end{cases}$$

where b is the distance between the first lens 14 and the intermediate imaging plane 13', c is the distance between the intermediate imaging plane 13' and the second lens 14', $\phi_1$ is the power of the first lens 14, and $\phi_2$ is the power of the second lens 14'.

By varying the powers $\phi_1$ and $\phi_2$ of the first and second lenses 14 and 14' with the displacement of the object surface so as to satisfy $$\phi_1 = \frac{1}{4f} + \frac{3}{2a}$$

-continued
$$\phi_2 = \frac{a}{8f^2} + \frac{3}{4}\frac{1}{f},$$

it is possible to make the position of the imaging plane constant while keeping the erect one-to-one magnification imaging.

Figure 9A:
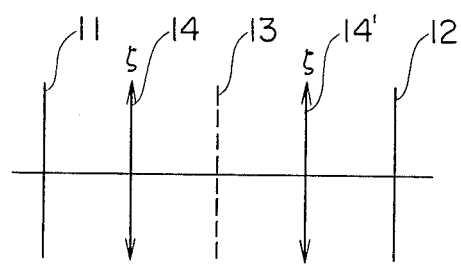
Figure 9B:
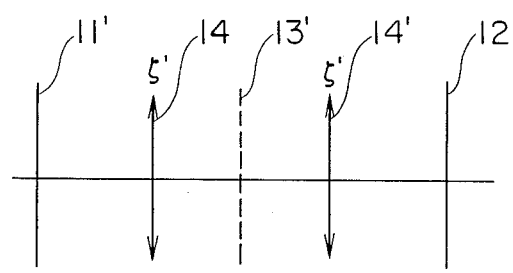

FIGS. 9A and 9B show another method for bringing the object surface and the imaging plane back into a conjugate relation while keeping the erect one-to-one magnification relation when the conjugate relation between the object surface and the imaging plane is destroyed. FIG. 9A is entirely similar to FIG. 8A and shows the lens arrangement in the standard state. FIG. 9B shows the lens arrangement when the object surface 11 shown in FIG. 9A is displaced to a position indicated by 11'. In the method shown in FIGS. 9A and 9B, the powers of the first lens 14 and the second lens 14' are varied equally and the lenses 14 and 14' are displaced while the spacing between the lenses 14 and 14' is kept unchanged so that the intermediate position between the lenses 14 and 14' is coincident with the intermediate position between the object surface 11' and the imaging plane 12. The powers of the lenses 14 and 14' are varied so that the image of the object surface 11' by the lens 14, namely, the intermediate image, is formed at this intermediate position.

Figure 10:
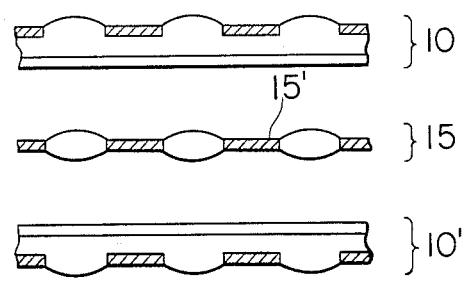
FIG. 10 shows another embodiment of the compound-eye optical system using the array lens according to the present invention.

FIG. 10 shows an optical system improved in resolution and brightness of lens by improving the compound-eye optical system shown in FIG. 7. In FIG. 10, reference numeral 15 designates a fixed focus array lens disposed near the position of the intermediate imaging plane 13 in FIG. 8A or 9A. The array lens 15 disposed at such a position acts as a so-called field lens which affects the direction of travel of a light beam but affects the convergence or divergence of the light beam in no way and at the same time, the non-lens portion 15' of the array lens 15 is made non-transparent and has the function of eliminating a harmful light beam. It is desirable from the viewpoint of the function as a field lens that the array lens 15 be displaced so as to be always disposed at the position of the intermediate imaging plane, and in FIGS. 8B and 9B, it is desirable that the array lens 15 be displaced to the position indicated at 13'. Where the amount of displacement of the object surface is small, the position of the array lens 15 may be fixed, but in that case the power of the field lens 15 somewhat takes effect and therefore, it is necessary to determine the powers of the lenses 14 and 14' with that effect taken into account.

In FIGS. 8A and 9A, description has been made of a case where the imaging magnification of the object surface 11 on the intermediate imaging plane is −1, but to enhance the density of the openings in the array lens and improve the brightness of the optical system, it is desirable that this imaging magnification be a reduction. Again in such a case, it is apparent that the method for focusing shown in FIGS. 8A and 8B or 9A and 9B can be applied. In short, to adjust the focus of the object surface to the imaging plane while keeping the erect one-to-one magnification imaging, there may be optically two degrees of freedom and, by using the variable power of the array lens according to the present invention as at least one of the two degrees of freedom, the object is achieved without involving the movement of a plurality of complicated array lenses.

Also, the array lens according to the present invention is effective in a compound-eye optical system having the magnification changing function. In this case, as in the case of the previously described erect one-to-one magnification imaging, the imaging magnification may be a desired value and in order to keep the position of the image plane constant, there may be optically two degrees of freedom. Also in this case, to keep the position of the image plane constant without resorting to the displacement of the object surface, three degrees of freedom are necessary. However, the difference of this case from the case of erect one-to-one magnification is that to obtain an image by properly superposing reduced or enlarged erect images one upon the other, it is necessary that the optical axes of single-eye optical systems constituting the compound-eye optical system be disposed while being made eccentric in a sector-like fashion correspondingly to the imaging magnification, and the distance between the object surface and the imaging plane differs between the single-eye optical systems.

Figure 11:
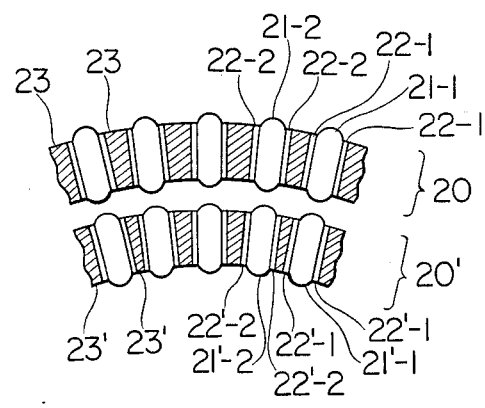
FIG. 11 schematically shows an embodiment in which the array lens according to the present invention is used in a variable magnification compound-eye optical system.

FIG. 11 shows an example of the compound-eye optical system having such a magnification changing function. In FIG. 11, reference numerals 20 and 20' designate variable focus array lenses according to the present invention. In FIG. 11, there is shown a case where individual lenses are constituted by elastic members 21-1, 21-2, . . . , 21'-1, 21'-2, . . . and cylindrical containers 22-1, 22-2, . . . , 22'-1, 22'-2, . . . comprising piezo elements. By applying a voltage to the containers 21-1, . . . comprising piezo elements, the containers are deformed diametrically thereof to thereby vary the volumes thereof, whereby as shown, the elastic members 21-1, . . . project from the openings of the containers 22-1, ... and thus, the focal lengths of the lenses constituting the array lenses 20, 20' can be controlled independently of one another.

Support members 23 and 23' supporting the lenses are formed of a flexible material, vary the degree of inflection thereof by a pressure from their surroundings and make the optical axis of each lens eccentric in a sector-like fashion in accordance with a desired imaging magnification. At this time, by controlling the focal lengths of the lenses constituting the array lenses 20, 20' so that each of said lenses images the object surface 11 on the imaging plane 12 at a desired imaging magnification, there is obtained the magnification changing function.

As described above, the array lens according to the present invention is easy to manufacture and excellent in reproducibility and the focal length thereof can be varied in a considerable range, and the array lens has various excellent effects both when singly used and when used as an array lens applied to a compound-eye optical system.

What is claimed is:

1. An array lens comprising:
   a member having a plurality of arranged openings;
   an elastic member means provided in contact with said member and having its surface shape deformable by external pressure; and
   means for imparting a force to said elastic member means to deform the surface shape of said elastic member means in said openings of said member.

2. An array lens according to claim 1, wherein a pressure is imparted to said elastic member means and the surface shape of said elastic member means has a positive power in said openings of said member.

3. An array lens according to claim 1, wherein said elastic member means is placed in tension and the surface shape of said elastic member means has a negative power in said openings of said member.

4. An array lens according to claim 1, wherein said member is formed on a single elastic member.

5. An array lens comprising:

a member having a plurality of arranged openings;

an elastic member provided in contact with said member and having its surface shape deformable by external pressure;

means for imparting a force to said elastic member to deform the surface shape of said elastic member in said openings of said member; and means for controlling the force imparted to said elastic member to vary the surface shape of said elastic member in said openings.

6. A compound-eye optical system comprising:

a first array lens; and a second array lens cooperating with said first array lens to form an image;

at least one of said first and second array lenses comprising a member having plurality of arranged openings, an elastic member provided in contact with said member and having its surface shape deformable by external pressure, and means for imparting a force to said elastic member to deform the surface shape of said elastic member in said openings of said member.

7. A compound-eye optical system according to claim 6, further comprising means for varying the force imparted to said elastic member to vary the magnification of an image formed by said compound-eye optical system.

* * * * *

UNITED STATES PATENT AND TRADEMARK OFFICE
CERTIFICATE OF CORRECTION

PATENT NO. : 4,783,141                    Page 1 of 3

DATED : November 8, 1988

INVENTOR(S) : Baba, et al.

It is certified that error appears in the above-identified patent and that said Letters Patent is hereby corrected as shown below:

COLUMN 1:

Lines 18 and 23, "Laid-open" should read --Laid-Open--.

Line 27, "a" should read --the--.

COLUMN 2:

Line 21, "back it" should read --it back--.

COLUMN 3:

Line 3, "of molecules." should read --of the molecules--.

COLUMN 5:

Line 55, "impossible" should read --possible--.

Line 61, "magnification" should read --magnification.--.

UNITED STATES PATENT AND TRADEMARK OFFICE
CERTIFICATE OF CORRECTION

PATENT NO. : 4,783,141
DATED : November 8, 1988
INVENTOR(S) : Baba, et al.

It is certified that error appears in the above-identified patent and that said Letters Patent is hereby corrected as shown below:

COLUMN 6:

Line 20, "are $\phi$" should read --are $\mathscr{y}$--.

Line 21, "1/$\phi$." should read --1/$\mathscr{y}$.--.

Line 49, "$\frac{1}{a} + \frac{1}{b} = \phi_1$" should read

--$\frac{1}{a} + \frac{1}{b} = \mathscr{y}_1$--.

Line 50, "$\frac{1}{c} + \frac{1}{2f} = \phi_2$" should read

--$\frac{1}{c} + \frac{1}{2f} = \mathscr{y}_2$--.

Line 60, "$\phi_1$" should read --$\mathscr{y}_1$--, and "$\phi_2$" should read

--$\mathscr{y}_2$--.

Line 62, "$\phi_1$ and $\phi_2$" should read --$\mathscr{y}_1$ and $\mathscr{y}_2$--.

Lines 66 and 67, "$\phi_1 = \frac{1}{4f} + \frac{3}{2a}$" should read

--$\mathscr{y}_1 = \frac{1}{4f} + \frac{3}{2a}$--

UNITED STATES PATENT AND TRADEMARK OFFICE
CERTIFICATE OF CORRECTION

PATENT NO. : 4,783,141

DATED : November 8, 1988

INVENTOR(S) : Baba, et al.

It is certified that error appears in the above-identified patent and that said Letters Patent is hereby corrected as shown below:

COLUMN 7:

Lines 2 and 3, "$\phi_2 = \frac{a}{8f^2} + \frac{3}{4} \frac{1}{f}$" should read --"$\mathscr{f}_2 = \frac{a}{8f^2} + \frac{3}{4} \frac{1}{f}$--

Signed and Sealed this

Twenty-seventh Day of November, 1990

Attest:

HARRY F. MANBECK, JR.

Attesting Officer     Commissioner of Patents and Trademarks